United States Patent
Klier

(10) Patent No.: US 12,368,385 B2
(45) Date of Patent: Jul. 22, 2025

(54) POWER SEMICONDUCTOR MODULE HAVING A SUBSTRATE, POWER SEMICONDUCTOR COMPONENTS AND HAVING A DC VOLTAGE CONNECTION DEVICE

(71) Applicant: SEMIKRON ELEKTRONIK GMBH & CO. KG, Nuremberg (DE)

(72) Inventor: Johannes Klier, Amberg (DE)

(73) Assignee: SEMIKRON ELEKTRONIK GMBH & CO. KG, Nuremberg (DE)

( * ) Notice: Subject to any disclaimer, the term of this patent is extended or adjusted under 35 U.S.C. 154(b) by 477 days.

(21) Appl. No.: 17/735,014

(22) Filed: May 2, 2022

(65) Prior Publication Data
US 2022/0368240 A1 Nov. 17, 2022

(30) Foreign Application Priority Data

May 12, 2021 (DE) ...................... 10 2021 112 410.7

(51) Int. Cl.
*H02M 7/00* (2006.01)
*H01R 4/02* (2006.01)

(52) U.S. Cl.
CPC ............ *H02M 7/003* (2013.01); *H01R 4/029* (2013.01)

(58) Field of Classification Search
CPC .......... H02M 7/003; H01R 4/30; H01R 4/029
See application file for complete search history.

(56) References Cited

U.S. PATENT DOCUMENTS

2011/0062491 A1* 3/2011 Nakata .................. H01L 25/072
257/146
2020/0066668 A1 2/2020 Umemoto
2020/0066686 A1* 2/2020 Mohn .................... H01L 25/072
(Continued)

FOREIGN PATENT DOCUMENTS

DE 102017109706 B3 3/2018
DE 102018103316 A1 8/2019
DE 112018002101 T5 2/2020
(Continued)

OTHER PUBLICATIONS 10 2021 112 410.7, German patent office examination report dated Jan. 22, 2025 4 pages—German; 5 pages—English, Certification of Translation dated Mar. 13, 2025.
(Continued)

*Primary Examiner* — Harry R Behm
(74) *Attorney, Agent, or Firm* — Andrew F. Young, ESQ; NOLTE LACKENBACH SIEGEL

(57) ABSTRACT

A power semiconductor module has a substrate that has an electrically non-conductive insulating layer and a first metal layer on the insulating layer and forms conductor tracks, with power semiconductor components arranged on the first metal layer and electrically connected to the first metal layer and having a DC voltage connection device that has a first, second and third flat conductor connection element that are arranged on an end region of the power semiconductor module and that are electrically conductively connected to the first metal layer. During operation, the first and second flat conductor connection elements have a first electrical polarity and the third flat conductor connection element has a second electrical polarity.

7 Claims, 3 Drawing Sheets

(56) References Cited

U.S. PATENT DOCUMENTS

2021/0143746 A1* 5/2021 Aoyagi ............... H02M 7/5387

FOREIGN PATENT DOCUMENTS

DE      102019114524 A1   12/2020
EP          0 609 528 A1    8/1994
WO    WO 2020/035931 A1   2/2020

OTHER PUBLICATIONS

DE 10 2021 112 410.7, Response to Examination Report filed Mar. 3, 2022 and Amended Claims; 8 pages—German, 12 pages—English (combined) Certification of Translation dated Nov. 15, 2024.

DE 10 2021 112 410.7, German Search Report 6 pages—German; 7 pages—English, Certification of Translation dated Nov. 15, 2021.

\* cited by examiner

POWER SEMICONDUCTOR MODULE HAVING A SUBSTRATE, POWER SEMICONDUCTOR COMPONENTS AND HAVING A DC VOLTAGE CONNECTION DEVICE

CROSS REFERENCE TO RELATED APPLICATIONS

This application relates to and claims priority to DE 10 2021 112 410.7 filed May 12, 2021, the entire contents of which are incorporated herein fully by reference.

FIGURE SELECTED FOR PUBLICATION

FIG. 1.

BACKGROUND OF THE INVENTION

Field of the Invention

The invention relates to a power semiconductor module having a substrate that has an electrically non-conductive insulating layer and a first metal layer arranged on the insulating layer and structured to form conductor tracks, having power semiconductor components arranged on the first metal layer and electrically conductively connected to the first metal layer and having a DC voltage connection device.

Description of the Related Art

In such a power semiconductor module, there is a technical need to design the DC voltage connection device as far as possible such that it enables a low-inductance electrically conductive connection of the power semiconductor module to an external electrical device, in particular to a DC voltage busbar.

DE 10 2017 109 706 B3 discloses a power semiconductor module that has a DC voltage connection device having a first and a second flat conductor connection element, between which an electrically non-conductive insulating layer is arranged.

Aspects and Objects of the Invention

The object of the invention is to provide a power semiconductor module whose DC voltage connection device enables a low-inductance electrically conductive connection of the power semiconductor module to an external electrical device, in particular to a DC voltage busbar.

This object is achieved by way of a power semiconductor module having a substrate that has an electrically non-conductive insulating layer and a first metal layer arranged on the insulating layer and structured to form conductor tracks, having power semiconductor components arranged on the first metal layer and electrically conductively connected to the first metal layer and having a DC voltage connection device that has a first, second and third flat conductor connection element that are arranged on an end region of the power semiconductor module and that are electrically conductively connected to the first metal layer, wherein, during operation of the power semiconductor module, the first and second flat conductor connection element have a first electrical polarity and the third flat conductor connection element has a second electrical polarity, wherein the first and second flat conductor connection element run over a first plane and the third flat conductor connection element runs over a second plane, wherein the normal directions of the first and second plane match, wherein the third flat conductor connection element is arranged between the first and second flat conductor connection element in the projection in the normal direction of the first plane.

It proves to be advantageous for the second plane to be arranged at a distance from the first plane in the normal direction of the first plane. A DC voltage busbar whose flat conductors have a larger thickness than the flat conductor connection elements is thereby easily able to be put into electrically conductive contact with the DC voltage connection device.

In this connection, it proves to be advantageous for the second plane to be arranged above the first plane, since a DC voltage busbar whose flat conductors have a larger thickness than the flat conductor connection elements is then particularly easily able to be put into electrically conductive contact with the DC voltage connection device.

It furthermore proves to be advantageous for the DC voltage connection device to have a flat conductor connecting element that runs over the first plane between the first and second flat conductor connection element and that electrically conductively connects the first and second flat conductor connection element to one another. The DC voltage connection device thereby has a particularly low inductance.

In this connection, it proves to be advantageous for the first and second flat conductor connection element and the flat conductor connecting element to be formed in one piece with one another. The first and second flat conductor connection element and the flat conductor connecting element are thereby of particularly simple design. The DC voltage connection device is furthermore thereby of particularly mechanically stable design.

It furthermore proves to be advantageous for an electrically non-conductive insulating layer to be arranged between the flat conductor connecting element and the third flat conductor connection element. The insulation resistance of the DC voltage connection device is thereby increased.

In this connection, it proves to be advantageous for the insulating layer to be formed from a plastic, in particular from polyimide, ethylene-tetrafluoroethylene copolymer or liquid crystal polymer, having a thickness of preferably 50 µm to 500 µm, particularly preferably of 75 µm to 150 µm. The DC voltage connection device thereby has a high insulation resistance.

It furthermore proves to be advantageous for the flat conductor connecting element to be in the form of a metal foil or metal sheet, having a thickness of preferably 300 µm to 2000 µm, particularly preferably of 500 µm to 1500 µm. The DC voltage connection device thereby has a particularly low inductance.

It furthermore proves to be advantageous for the first, second and third flat conductor connection element each to be in the form of a metal foil or metal sheet, each having a thickness of preferably 300 µm to 2000 µm, particularly preferably of 500 µm to 1500 µm. The DC voltage connection device thereby has a particularly low inductance.

It furthermore proves to be advantageous for the respective flat conductor connection element to run in a common direction, running perpendicular to the normal direction of the insulating layer, away from the substrate. The DC voltage busbar is thereby easily able to be put into electrically conductive contact with the DC voltage connection device.

What also proves to be advantageous is a power electronics arrangement having a power semiconductor module according to the invention and having a DC voltage busbar that has a first and a second flat conductor and an electrically non-conductive insulating layer arranged between the first and the second flat conductor, wherein the first flat conductor has a first and a second flat conductor connection and the second flat conductor has a third flat conductor connection, wherein the first flat conductor connection is put into electrically conductive contact with the first flat conductor connection element, the second flat conductor connection is put into electrically conductive contact with the second flat conductor connection element and the third flat conductor connection is put into electrically conductive contact with the third flat conductor connection element, in particular by way of a respective welded or pressure connection.

In this connection, it proves to be advantageous for the thickness of the first flat conductor connection to be greater than the thickness of the first flat conductor connection element, and for the thickness of the second flat conductor connection to be greater than the thickness of the second flat conductor connection element, and for the thickness of the third flat conductor connection to be greater than the thickness of the third flat conductor connection element. If multiple power semiconductor modules are electrically connected to a common DC voltage busbar, the flat conductors have to have a high current carrying capacity and thus in general have a larger thickness than the flat conductor connection elements of the power semiconductor module, this easily being made possible by the mechanical structure of the DC voltage connection device.

According to one aspect of the present invention, there is provided a power semiconductor module having a substrate that has an electrically non-conductive insulating layer and a first metal layer arranged on the insulating layer and structured to form conductor tracks, having power semiconductor components arranged on the first metal layer and electrically conductively connected to the first metal layer and having a DC voltage connection device that has a first, second and third flat conductor connection element that are arranged on an end region of the power semiconductor module and that are electrically conductively connected to the first metal layer, wherein, during operation of the power semiconductor module, the first and second flat conductor connection element have a first electrical polarity and the third flat conductor connection element has a second electrical polarity, wherein the first and second flat conductor connection element run over a first plane and the third flat conductor connection element runs over a second plane, wherein the normal directions of the first and second plane match, wherein the third flat conductor connection element is arranged between the first and second flat conductor connection element in the projection in the normal direction of the first plane.

The above and other aspects, features, objects, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
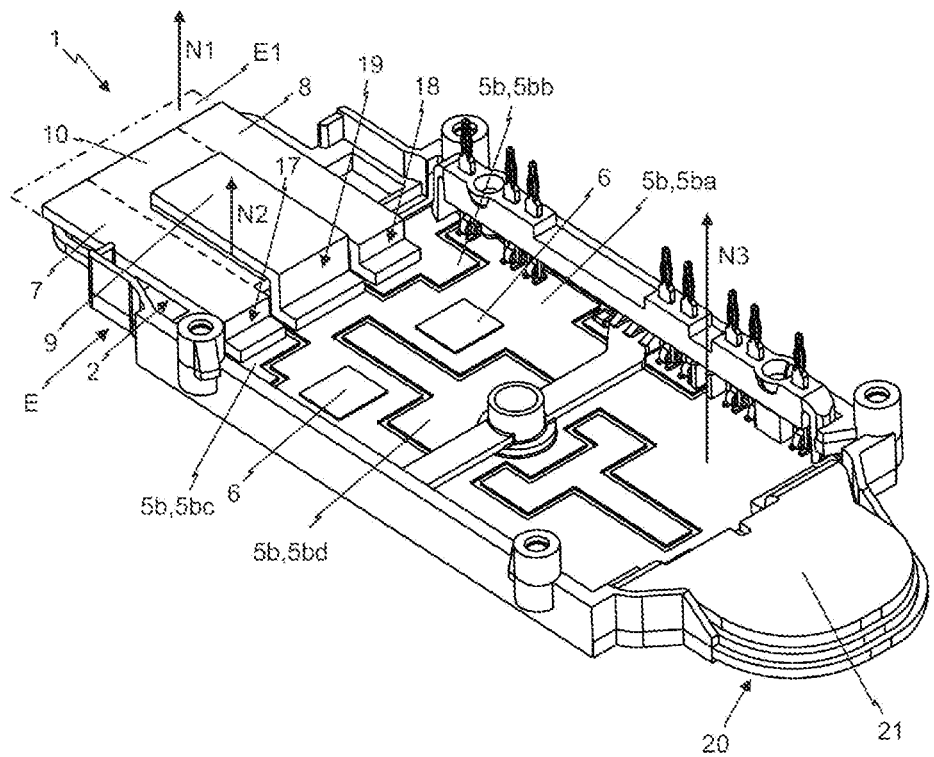
FIG. 1 shows a perspective view of a power semiconductor module according to the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Figure 2:
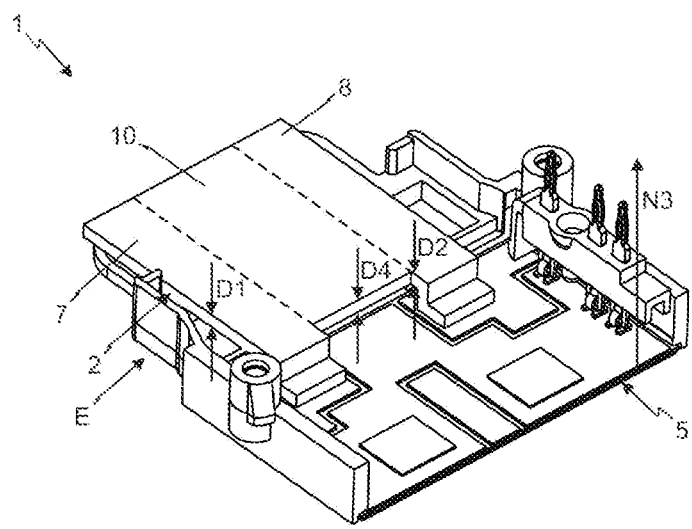
FIG. 2 shows a detailed view of FIG. 1.
Figure 3:
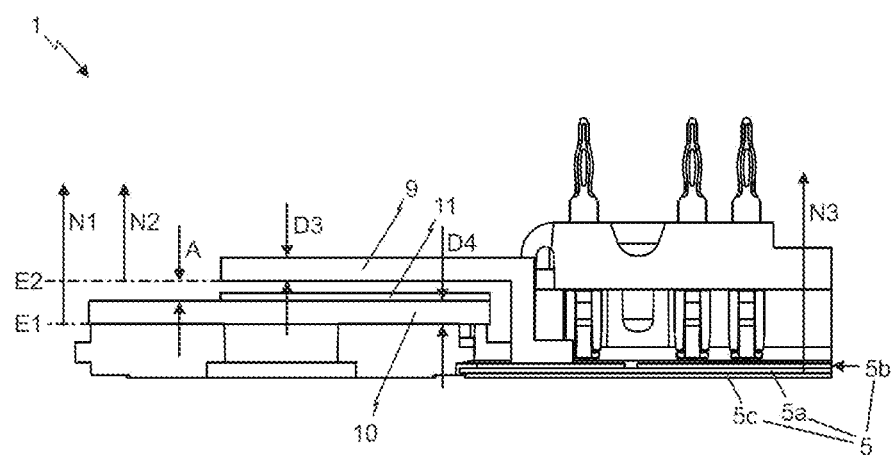
FIG. 3 shows a sectional view of FIG. 2.

FIG. 1 illustrates a perspective view of a power semiconductor module 1 according to the invention. FIG. 2 illustrates a detailed view of FIG. 1, and FIG. 3 illustrates a sectional view of FIG. 2.

The power semiconductor module 1 according to the invention has a substrate 5 that has an electrically non-conductive insulating layer 5a and a first metal layer 5b arranged on the insulating layer 5a and structured to form conductor tracks 5ba, 5bb, 5bc, 5bd. The substrate 5 may have a second metal layer 5c that is arranged on that side of the insulating layer 5a opposite the first metal layer 5b. The insulating layer 5a may for example be in the form of a ceramic plate. The substrate 5 may for example be in the form of a direct copper bonded substrate (DCB substrate), an active metal brazing substrate (AMB substrate) or an insulated metal substrate (IMS).

The power semiconductor module 1 furthermore has power semiconductor components 6 arranged on the first metal layer 5b and electrically conductively connected to the first metal layer 5b. The power semiconductor components 6 are put into electrically conductive contact with the first metal layer 5b by way of a respective sinter or solder layer, not illustrated in the figures for the sake of clarity, which is arranged between the power semiconductor components 6 and the first metal layer 5b. The respective power semiconductor component 6 is preferably in the form of a power semiconductor switch, in particular in the form of a transistor (such as for example an IGBT (insulated-gate bipolar transistor) or a MOSFET (metal-oxide-semiconductor field-effect transistor)) or a thyristor or a diode. In the exemplary embodiment, those electrical connection faces of the power semiconductor components 6 facing away from the substrate 5 are electrically conductively connected to one another and to the substrate 5 in terms of circuitry by way of an electrically conductive composite foil, this not being illustrated in the figures for the sake of clarity.

The power semiconductor module 1 furthermore has a DC voltage connection device 2 that has a first, second and third flat conductor connection element 7, 8 and 9 that are arranged on an end region E of the power semiconductor module 1 and that are electrically conductively connected to the first metal layer 5b. The DC voltage connection device 2 serves for the electrical DC voltage connection of the power semiconductor module 1 to an external device, in particular to a DC voltage busbar 13 (see FIG. 4 and FIG. 5). In the context of the exemplary embodiment, the first flat conductor connection element 7 is electrically conductively connected to the first metal layer 5b by way of an electrically conductive first connection element 17, the second flat conductor connection element 8 is electrically conductively connected to the first metal layer 5b by way of an electrically conductive second connection element 18, and the third flat conductor connection element 9 is electrically conductively connected to the first metal layer 5b by way of an electrically conductive third connection element 19.

During operation of the power semiconductor module 1, the first and second flat conductor connection element 7 and 8 have a first electrical polarity and the third flat conductor connection element 9 has a second electrical polarity. The first priority may be positive and the second polarity may be negative, or vice versa.

The first and second flat conductor connection element 7 and 8 run over a first plane E1 and the third flat conductor connection element 9 runs over a second plane E2, wherein the normal directions N1 and N2 of the first and second plane E1 and E2 match. The third flat conductor connection element 9 is arranged relatively between the first and second flat conductor connection element 7 and 8 along the projection in the normal direction N2 of the first plane E1.

Through this geometric arrangement of the first, second and third flat conductor connection element 7, 8 and 9, the DC voltage connection device 2 enables a low-inductance electrical connection of the power semiconductor module 1 to an external electrical device, in particular to a DC voltage busbar 13.

The second plane E2 is preferably, as in the exemplary embodiment, arranged at a distance from the first plane E1 in the normal direction N1 of the first plane E1. The second plane E2 is preferably arranged above the first plane E1, such that the second plane E2 is further away from the substrate 5 than the first plane E1.

The DC voltage connection device 2 preferably has a flat conductor connecting element 10 that runs between the first and second flat conductor connection element 7 and 8 over the first plane E1 and that electrically conductively connects the first and second flat conductor connection element 7 and 8 to one another. The third flat conductor connection element 9 is arranged flush [to] on the flat conductor connecting element 10 in the normal direction N1 of the first plane E1. The first and second flat conductor connection element 7, 8 and the flat conductor connecting element 10 are preferably formed in one piece with one another, as in the exemplary embodiment. In FIG. 1 and FIG. 2, the flat conductor connection elements 7, 8 and the flat conductor connecting element 10 are illustrated in a manner separated from one another by two dashed separating lines.

An electrically non-conductive insulating layer 11 is preferably arranged between the flat conductor connecting element 10 and the third flat conductor connection element 9. The insulating layer 11 is preferably formed from a plastic, in particular from polyimide, ethylene-tetrafluoroethylene copolymer or liquid crystal polymer having a thickness of preferably 50 µm to 500 µm, particularly preferably of 75 µm to 150 µm.

The first, second and third flat conductor connection element 7, 8 and 9 are preferably each in the form of a metal foil or metal sheet, each having a thickness D1, D2, D3 of preferably 300 µm to 2000 µm, particularly preferably of 500 µm to 1500 µm.

In the context of the exemplary embodiment, and as illustrated in the FIGS. 1-5, the respective flat conductor connection elements 7, 8 or 9 include substantial portions each of which runs in a common direction, along respective first plane E1 and second plane E2 spaced from substrate 5 along a normal direction N3 of the insulating layer 5a; and each with a respective designated connection portion 7a, 8a, and 9a that runs along the normal direction N3 of the insulating layer 5a, to connect with first metal layer 5b above from the substrate 5.

The power semiconductor module 1 furthermore has an AC connection device 20 that has a fourth flat conductor connection element 21 that is arranged on a further end region of the power semiconductor module 1 and that is electrically conductively connected to the first metal layer 5b. The AC connection device 20 serves for the electrical AC voltage connection of the power semiconductor module 1 to a further external device, in particular to an electric motor.

Figure 4:
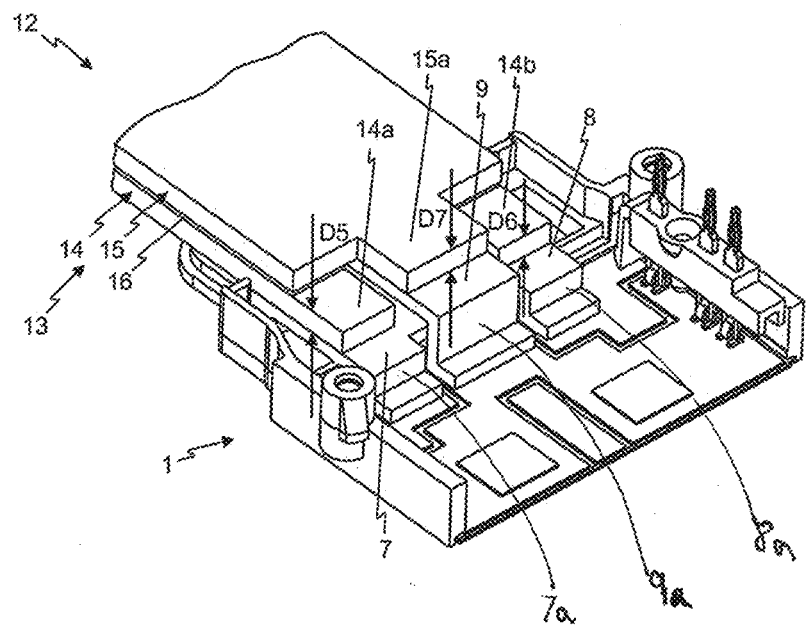
FIG. 4 shows a power electronics arrangement having a power semiconductor module according to the invention and having a DC voltage busbar electrically conductively connected to the power semiconductor module.
Figure 5:
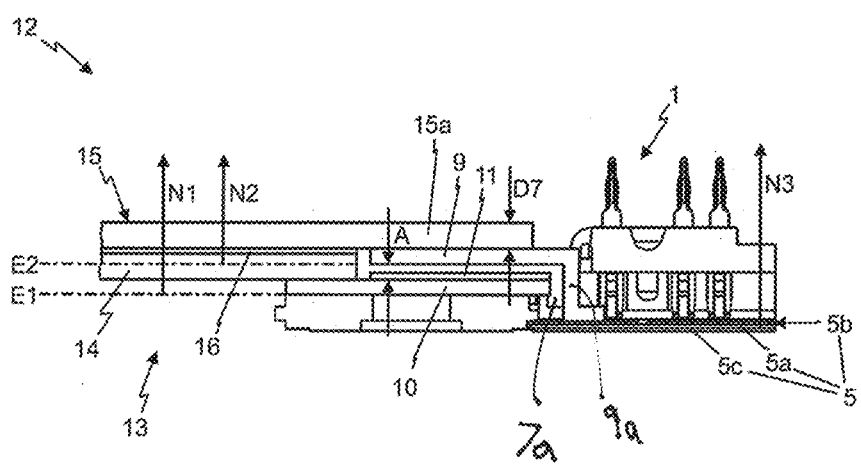
FIG. 5 shows a sectional view of FIG. 4.

FIG. 4 and FIG. 5 illustrate, by way of example, a power electronics arrangement 12 having the power semiconductor module 1 according to the invention and having a DC voltage busbar 13 electrically conductively connected to the power semiconductor module 1.

The DC voltage busbar 13 has a first and a second flat conductor 14 and 15 and an electrically non-conductive insulating layer 16 arranged between the first and the second flat conductor 14 and 15. The first flat conductor 14 has a first and a second flat conductor connection 14a and 14b and the second flat conductor 15 has a third flat conductor connection 15a. The first flat conductor connection 14a is put into electrically conductive contact with the first flat conductor connection element 7, the second flat conductor connection 14b is put into electrically conductive contact with the second flat conductor connection element 8 and the third flat conductor connection 15a is put into electrically conductive contact with the third flat conductor connection element 9, in particular by way of a respective welded or pressure connection.

The thickness D5 of the first flat conductor connection 14a is preferably greater than the thickness D1 of the first flat conductor connection element 7. The thickness D6 of the second flat conductor connection 14b is preferably greater than the thickness D2 of the second flat conductor connection element 8. The thickness D7 of the third flat conductor connection 15a is preferably greater than the thickness D3 of the third flat conductor connection element 9. If multiple power semiconductor modules 1 are electrically connected to a common DC voltage busbar 13, the flat conductors have to have a high current carrying capacity and thus in general have a larger thickness than the flat conductor connection elements 7, 8 and 9 of the power semiconductor module 1. Due to the fact that, in the DC voltage connection device 2 of the power semiconductor module 1, the distance A between the first and second flat conductor connection element 7 and 8 and the third flat conductor connection element 9 in the normal direction N1 of the first plane E1 and the distance A between the flat conductor connecting element 10 and the third flat conductor connection element 9 in the normal direction N1 of the first plane E1 (see FIG. 5) is easily able to be changed by design, the power semiconductor module 1 is able to be adapted to the required thickness of the flat conductors of the DC voltage busbar 13 without any great effort during manufacture thereof. The thicker the flat conductors are designed, the greater the distance A may be selected or configured during manufacture of the power semiconductor module 1. As an alternative or in addition, the third flat conductor connection 15a may have an offset running below the third flat conductor connection element 9 and in electrically conductive contact with the third flat conductor connection element 9.

Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A power semiconductor module, comprising:
    a substrate that has an electrically non-conductive insulating layer and a first metal layer arranged on a first side of the insulating layer and said first metal layer is structured to form a plurality of respective conductor tracks spaced apart from each other,
    a second metal layer that is arranged a second side of the insulating layer opposite from said first metal layer;
    a plurality of power semiconductor components arranged on the first metal layer and electrically conductively connected to the first metal layer at respective ones of said respective conductor tracts;
    a DC voltage connection device has a first, a second and a third flat conductor connection element that are arranged on an end region (E) of the power semiconductor module and that are electrically conductively connected to the first metal layer;
        wherein, during an operation of the power semiconductor module, the first and second flat conductor connection element have a first electrical polarity and the third flat conductor connection element has a second electrical polarity that is an opposite polarity from said first electrical polarity;
    the first and the second flat conductor connection elements extend in part over respectively a first plane (E1) that is parallel to said substrate;
    wherein the DC voltage connection device has a flat conductor connecting element that runs over the first plane (E1) between the first and second flat conductor connection element and that electrically conductively connects the first and second flat conductor connection element to one another,
    the first and the second flat conductor connection elements and the flat connecting element are formed as a unitary one piece with one another;
    the third flat conductor connection element extends in part over a second plane (E2) above said flat connecting element;
    an electrically non-conductive insulating layer is arranged between the flat conductor connecting element and the third flat conductor connection element;
    the second plane (E2) is arranged at a distance from the first plane (E1) in a normal direction (N1) of the first plane (E1) wherein the second plane (E2) is arranged above the first plane (E1) and away from substrate;
    said respective normal direction (N1) of said first plane (E1) matches a respective normal direction (N2) of the second plane (E2);
    said first and said second flat conductor connection elements and said third flat conductor connection element each arranged above said first metal layer along said normal direction (N1);
    the third flat conductor connection element is arranged in part along said second plane (E2), in a location that is both between and spaces apart the first and second flat conductor connection element and is elevated in a projection in the normal direction (N1) above the first plane (E1);
    whereby said first, said second and said third flat conductor connection element that are arranged on said end region (E) of the power semiconductor module and that are electrically conductively connected to the first metal layer each have respective connection portions that extend from respective first, second, and third flat conductor connection elements in said respective normal direction (N1) to said first metal layer above said substrate.

2. The power semiconductor module, according to claim 1, wherein:
    the insulating layer is formed from a plastic selected from a group of plastics consisting of polyimide, ethylene-tetrafluoroethylene copolymer, and liquid crystal polymer; and
    the insulating layer bas thickness of 50 μm to 500 μm.

3. The power semiconductor module, according to claim 1, wherein:
    the flat conductor connecting element is in the form of a metal foil or metal sheet; and
    the flat conductor has a thickness (D4) of 300 μm to 2000 μm.

4. The power semiconductor module, according to claim 3, wherein:
    the first, second and third flat conductor connection element are each in the form of a metal foil or metal sheet; and
    each said flat conductor connection element has a thickness (D1, D2, D3) of 300 μm to 2000 μm.

5. The power semiconductor module, according to claim 4, wherein:
    the respective flat conductor connection element runs in a common direction, running perpendicular to the normal direction (N3) of the insulating layer, and away from the substrate.

6. A power electronics arrangement, comprising:
    a power semiconductor module according to claim 1;
    further comprising:
        having a DC voltage busbar that has a first and a second flat conductor and an electrically non-conductive insulating layer arranged between the first and the second flat conductor;
        the first flat conductor has a first and a second flat conductor connection and the second flat conductor has a third flat conductor connection;
        the first flat conductor connection is in electrically conductive contact with the first flat conductor connection element, the second flat conductor connection is in electrically conductive contact with the second flat conductor connection element and the third flat conductor connection is in electrically conductive contact the third flat conductor connection element, by way of a respective welded connection or a pressure connection.

7. The power electronics arrangement, according to claim 6, wherein:
the thickness (D5) of the first flat conductor connection is greater than the thickness (D1) of the first flat conductor connection element;
the thickness (D6) of the second flat conductor connection is greater than the thickness (D2) of the second flat conductor connection element; and
the thickness (D7) of the third flat conductor connection is greater than the thickness (D3) of the third flat conductor connection element.

* * * * *